US011314153B2

(12) United States Patent
Shiozaki et al.

(10) Patent No.: US 11,314,153 B2
(45) Date of Patent: Apr. 26, 2022

(54) ELECTRONIC APPARATUS AND METHOD OF CONTROLLING ELECTRONIC APPARATUS

(71) Applicant: CANON KABUSHIKI KAISHA, Tokyo (JP)

(72) Inventors: Tomoyuki Shiozaki, Kanagawa (JP); Hiroshi Toriumi, Kanagawa (JP); Yoichiro Imai, Tokyo (JP); Daiyu Ueno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/192,716

(22) Filed: Mar. 4, 2021

(65) Prior Publication Data

US 2021/0294185 A1    Sep. 23, 2021

(30) Foreign Application Priority Data

Mar. 18, 2020   (JP) .............................. JP2020-047684
Mar. 18, 2020   (JP) .............................. JP2020-047685

(51) Int. Cl.
*G03B 17/55*     (2021.01)
*H04N 5/225*     (2006.01)
*H04N 5/232*     (2006.01)
*H04N 5/77*      (2006.01)

(52) U.S. Cl.
CPC .......... *G03B 17/55* (2013.01); *H04N 5/2252* (2013.01); *H04N 5/22521* (2018.08); *H04N 5/23241* (2013.01); *H04N 5/772* (2013.01)

(58) Field of Classification Search
CPC ............... G03B 17/55; H04N 5/22521; H04N 5/23241; H04N 5/2252; H04N 5/772
See application file for complete search history.

(56) References Cited

U.S. PATENT DOCUMENTS

| 6,826,361 B1* | 11/2004 | Yost ................... | H04N 5/23212 396/97 |
| 2007/0285542 A1* | 12/2007 | Suzuki ............. | H04N 5/232941 348/294 |
| 2011/0119018 A1* | 5/2011 | Skarp ...................... | G01K 7/42 702/130 |

(Continued)

FOREIGN PATENT DOCUMENTS

| JP | 2004005292 A | 1/2004 |
| JP | 2012165372 A | 8/2012 |

(Continued)

*Primary Examiner* — Timothy J Henn
(74) *Attorney, Agent, or Firm* — Canon U.S.A., Inc. IP Division

(57) ABSTRACT

An apparatus includes a first sensor configured to acquire a first temperature at a predetermined position, a second sensor configured to acquire a second temperature at a position different from the predetermined position, a controller configured to limit a predetermined function, and a prediction unit configured to obtain an environmental temperature based on a difference between the first temperature and the second temperature, and information about temporal variation of the difference between the first temperature and the second temperature in a case where the predetermined function is performed.

15 Claims, 7 Drawing Sheets

(56) References Cited

U.S. PATENT DOCUMENTS

| | | | |
|---|---|---|---|
| 2012/0189264 A1* | 7/2012 | Okazaki | G03B 17/55 386/227 |
| 2013/0037533 A1* | 2/2013 | Namekawa | G01K 3/14 219/494 |
| 2017/0102748 A1* | 4/2017 | Takahashi | G06F 1/206 |

FOREIGN PATENT DOCUMENTS

| | | |
|---|---|---|
| JP | 2012249012 A | 12/2012 |
| JP | 2014171002 A | 9/2014 |
| JP | 2017120181 A | 7/2017 |

* cited by examiner

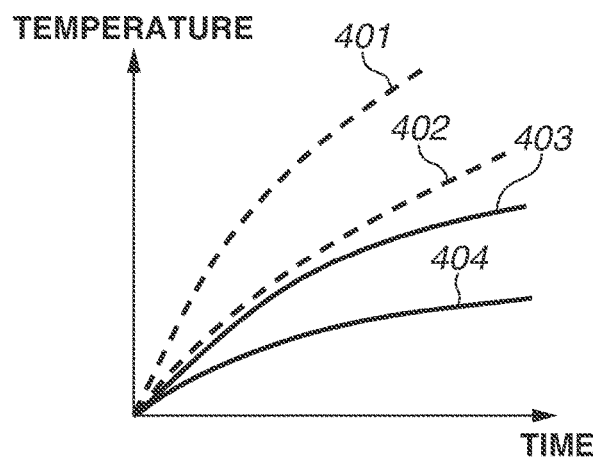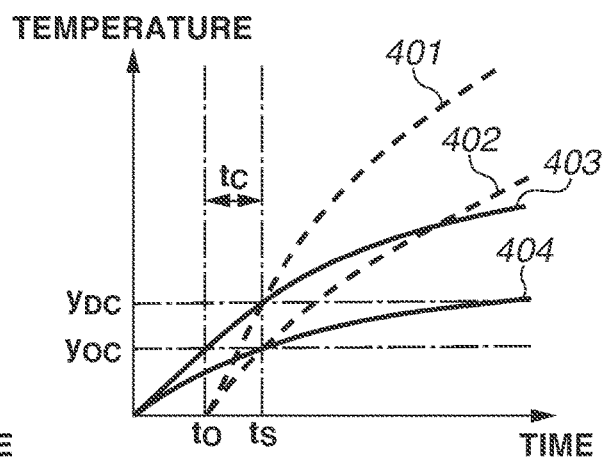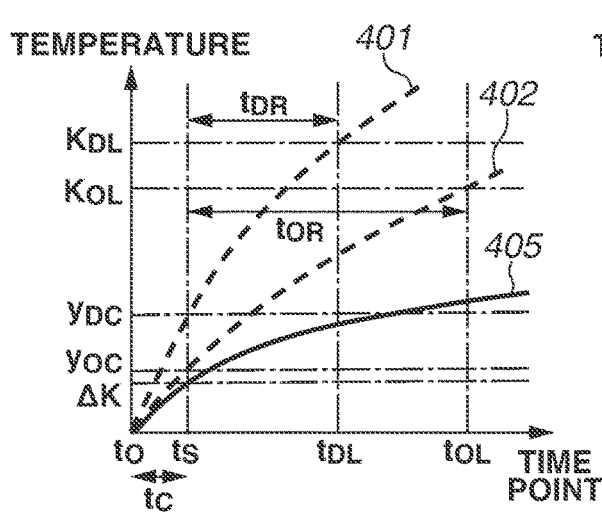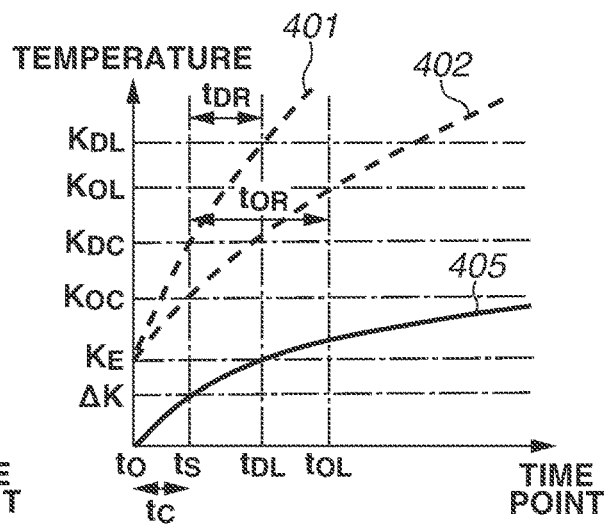

ELECTRONIC APPARATUS AND METHOD OF CONTROLLING ELECTRONIC APPARATUS

BACKGROUND OF THE DISCLOSURE

Field of the Disclosure

The aspect of the embodiments relates to an electronic apparatus and a method of controlling the electronic apparatus, and particularly to an electronic apparatus including an electronic device that generates heat with operation.

Description of the Related Art

In recent years, a small-size portable electronic apparatus having high functionality, such as a digital camera and a mobile phone has become popular. For example, even with digital cameras having the same moving image capturing function, the digital camera can perform advanced image processing such as filter processing and image correction on image data of a large number of pixels, and can record an image at a higher frame rate. In addition, a function other than the image capturing function such as a wireless transfer function of a captured still image and a captured moving image file has been employed.

Electronic devices such as an image capturing device, a wireless module, and an image processing central processing unit (CPU), implementing these functions serve as heat generation sources to increase a temperature inside a housing of the digital camera. Accordingly, operation is limited so that the temperature inside the housing of the digital camera does not exceed an operation guarantee upper limit temperature of each of the electronic devices. Further, increase in temperature of the image capturing device deteriorates the quality of the captured image. In addition, since the electronic devices are mounted in the small housing, an exterior of the housing also generates heat during operation. The exterior of the housing is directly touched by a user. Thus, the temperature of the exterior of the housing is controlled to a predetermined temperature or lower.

Japanese Patent Application Laid-Open No. 2012-165372 discusses an image capturing apparatus that calculates a time until the temperature inside the housing reaches a predetermined temperature, from a variation of a measurement value of a thermometer disposed inside the housing of the camera in moving image capturing, and displays the calculated time. When the temperature inside the housing reaches the predetermined temperature, the image capturing apparatus discussed in Japanese Patent Application Laid-Open No. 2012-165372 stops moving image recording.

In the technique discussed in Japanese Patent Application Laid-Open No. 2012-165372 described above, in a case where it becomes necessary to stop the moving image recording because of increase in temperature of the housing of the digital camera, the moving image recording is stopped. This makes it possible to control the temperature of the housing of the digital camera to the predetermined temperature or lower. Further, displaying the time from start to stop of the moving image recording makes it possible to previously notify the user of stop of the moving image recording.

In the image capturing apparatus disclosed in Japanese Patent Application Laid-Open No. 2012-165372, however, prediction accuracy deteriorates in a case where an environmental temperature is varied.

Further, the image capturing apparatus discussed in Japanese Patent Application Laid-Open No. 2012-165372 cannot predict the time until the temperature of the housing reaches the predetermined temperature unless the moving image recording is started. Thus, after the user starts the moving image recording, the moving recoding time becomes insufficient to moving image recording time expected by the user before the recording is started. As a result, a necessary scene may not be recordable.

SUMMARY OF THE DISCLOSURE

According to an aspect of the embodiments, an apparatus includes a first sensor configured to acquire a first temperature at a predetermined position, a second sensor configured to acquire a second temperature at a position different from the predetermined position, a controller configured to limit a predetermined function, and a prediction unit configured to obtain an environmental temperature based on a difference between the first temperature and the second temperature, and information about temporal variation of the difference between the first temperature and the second temperature in a case where the predetermined function is performed.

Further features of the disclosure will become apparent from the following description of exemplary embodiments with reference to the attached drawings.

BRIEF DESCRIPTION OF THE DRAWINGS

FIGS. 4A, 4B, 4C, and 4D are graphs illustrating temporal variation of output values of the respective temperature sensors.

DESCRIPTION OF THE EMBODIMENTS

Figure 1A:
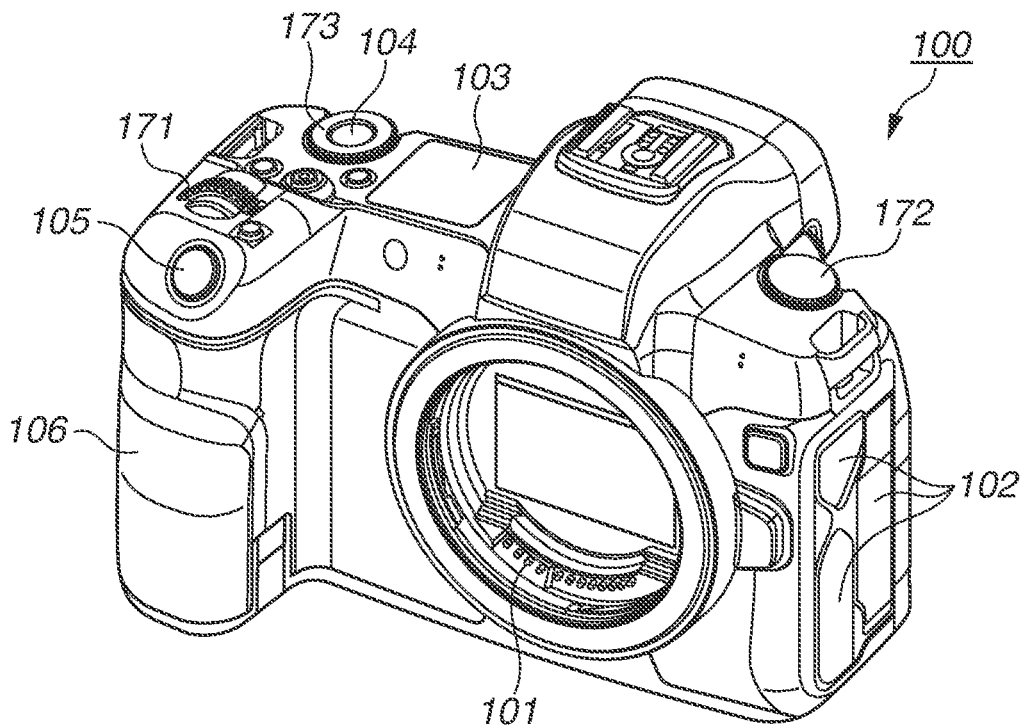
FIGS. 1A and 1B are perspective views respectively illustrating a front surface and a rear surface of the digital camera according to a first exemplary embodiment.

Exemplary embodiments of the disclosure will be described in detail below with reference to the accompanying drawings. In the following description of the exemplary embodiments, the same configurations, operations, and processes are denoted by the same reference numerals in the drawings. Further, in the exemplary embodiments, a digital camera, which is an image capturing apparatus, is described as an example of an electronic apparatus according to the disclosure. However, the digital camera is just an example, and the electronic apparatus according to the disclosure is not limited to the digital camera.

Figure 7:
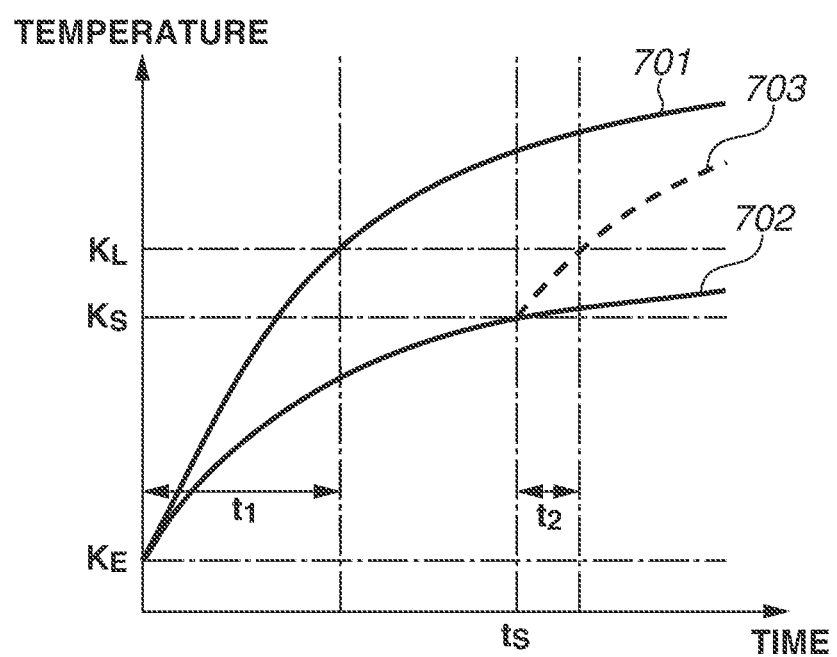
FIG. 7 is a graph illustrating temporal variation of a temperature inside a housing of a conventional digital camera during moving image capturing.

First, an operation limitation control performed by a conventional digital camera with increase in temperature is described with reference to FIG. 7. FIG. 7 is a graph illustrating an example of temporal variation of a temperature inside a housing of the digital camera during moving image capturing.

A curve 701 represents a temporal variation of the temperature inside the housing of the digital camera during a moving image recording state. A curve 702 represents a temporal variation of the temperature inside the housing of the digital camera during a moving image recording standby state before the moving image recording. During the moving image recording standby state, moving image encoding processing by an image processing unit and writing processing of moving image data to a recording medium are not performed. Therefore, increase in temperature inside the housing is gentle as compared with that during the moving image recording.

For example, when an operation limit temperature is defined as $K_L$, the temperature inside the housing of the digital camera reaches the operation limit temperature $K_L$ in a time $t_1$ after the moving image recording is started, during the moving image recording (curve 701) under an environmental temperature $K_E$. In other words, in a case where the moving image recording is started, the time $t_1$ is a moving image recordable time. On the other hand, during the moving image recording standby state (curve 702), the temperature inside the housing of the digital camera does not reach the operation limit temperature $K_L$.

Next, a curve 703 represents a temporal variation of the temperature inside the housing in a case where the moving image recording is started at a time point $t_S$ in the moving image capturing standby state. At this time, the temperature inside the housing reaches the moving image operation limit temperature $K_L$ in a time $t_2$ from the start of the moving image recording. In other words, in this case, the moving image recordable time predicted before the recording is started becomes short after the start of actual recording.

Accordingly, a temperature increase rate inside the housing is different between during the moving image recording standby state and during the moving image recording state. Thus, during the moving image recording standby state, the moving image recordable time $t_2$ cannot be predicted by a method of observing the temperature variation of a thermometer.

Figure 1B:
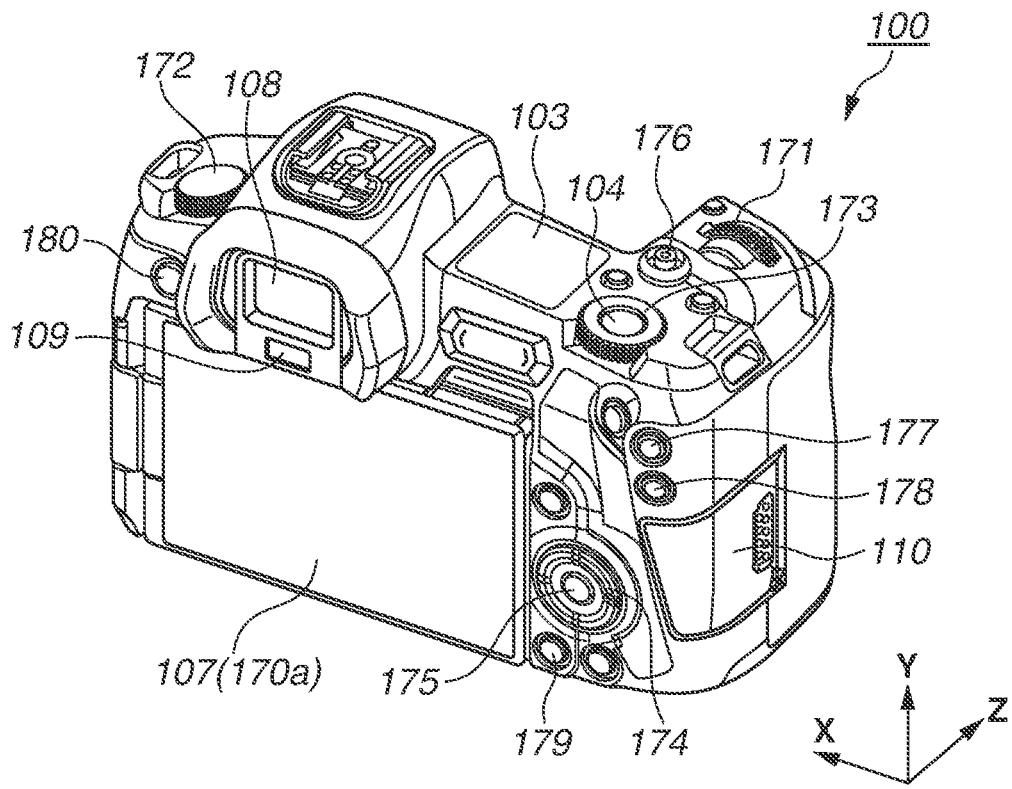

An image capturing apparatus, which is an electronic apparatus, to which a first exemplary embodiment of the disclosure is applicable is described with reference to FIGS. 1A and 1B. FIGS. 1A and 1B are diagrams illustrating an external appearance of a digital camera 100 as an example of the image capturing apparatus according to a first exemplary embodiment. FIG. 1A is a perspective view illustrating a front surface of the digital camera 100, and FIG. 1B is a perspective view illustrating a rear surface of the digital camera 100.

A communication terminal 101 is a communication terminal for the digital camera 100 to communicate with a (attachable and detachable) lens unit 200 described below.

A terminal cover 102 is a cover to protect a connector (not illustrated) to which an external device such as a connection cable is connected.

An out-of-finder display unit 103 is provided on a top surface of the digital camera 100, and displays setting values of the digital camera 100 such as a shutter speed and an aperture value.

A mode selection switch 104 is an operation unit to select any of various kinds of modes relating to image capturing and reproduction.

A shutter button 105 is an operation unit to perform image capturing instruction. For example, the shutter button 105 generates an image capturing preparation instruction in response to half depression (SW1), and captures an image in response to full depression (SW2).

A grip portion 106 is a grip portion having a shape easily grasped by a right hand when a user holds the digital camera 100. In the present exemplary embodiment, the shutter button 105 and a main electronic dial 171 described below are arranged at positions operable by a forefinger of the right hand in a state where the user grasps the grip portion 106 by a little finger, a third finger, and a middle finger of the right hand to hold the digital camera 100. Further, an electronic sub-dial 173 described below is arranged at a position operable by a thumb of the right hand in the same state.

A display unit 107 displays an image and various kinds of information. The display unit 107 includes a touch panel 170a on a surface thereof, and the touch panel 170a can detect touch operation on a display surface (operation surface) of the display unit 107.

An eyepiece portion 108 is an eyepiece portion for an eyepiece finder (look-in finder). The user can visually recognize an image displayed on an inside electric view finder (EVF) 213 described below, through the eyepiece portion 108.

An eye proximity detection unit 109 is an eye proximity detection sensor detecting whether an eye of the user is in proximity to the eyepiece portion 108.

A lid 110 is a lid for a slot storing a recording medium 260 described below.

The main electronic dial 171 is a rotary operation member. The setting values such as the shutter speed and the aperture value can be changed by rotating the main electronic dial 171.

A power supply switch 172 is an operation member to switch on and off of the power supply of the digital camera 100.

The electronic sub-dial 173 is a rotary operation member, and can perform movement of a selected frame and image feeding.

A cross key 174 is a cross key (four-direction key) in which an upper part, a lower part, a right part, and a left part are pushable. The operation corresponding to the pushed part of the cross key 174 is performed.

A set button 175 is a push button and is mainly used to, for example, determine a selected item.

A moving image button 176 is used to instruct start and stop of the moving image capturing (recording).

An automatic exposure (AE) lock button 177 fixes an exposure state when pressed in an image capturing standby state.

An enlargement button 178 is an operation button to turn on and off an enlargement mode in a live view display of the image capturing mode. When the main electronic dial 171 is operated after the enlargement mode is turned on, the live view image is enlarged or reduced. In a reproduction mode, the enlargement button 178 functions as an enlargement button to enlarge a reproduced image and to increase an enlargement ratio.

A reproduction button 179 is an operation button to switch the image capturing mode and the reproduction mode. When the reproduction button 179 is pressed in the image capturing mode, the operation mode shifts to the reproduction mode, and for example, the latest image among the images recorded in the recording medium 260 described below can be displayed on the display unit 107.

When a menu button 180 is pressed, a menu screen for various kinds of setting is displayed on the display unit 107. The user can perform various kinds of setting by using the menu screen displayed on the display unit 107, and the cross key 174, and the set button 175.

Figure 2:
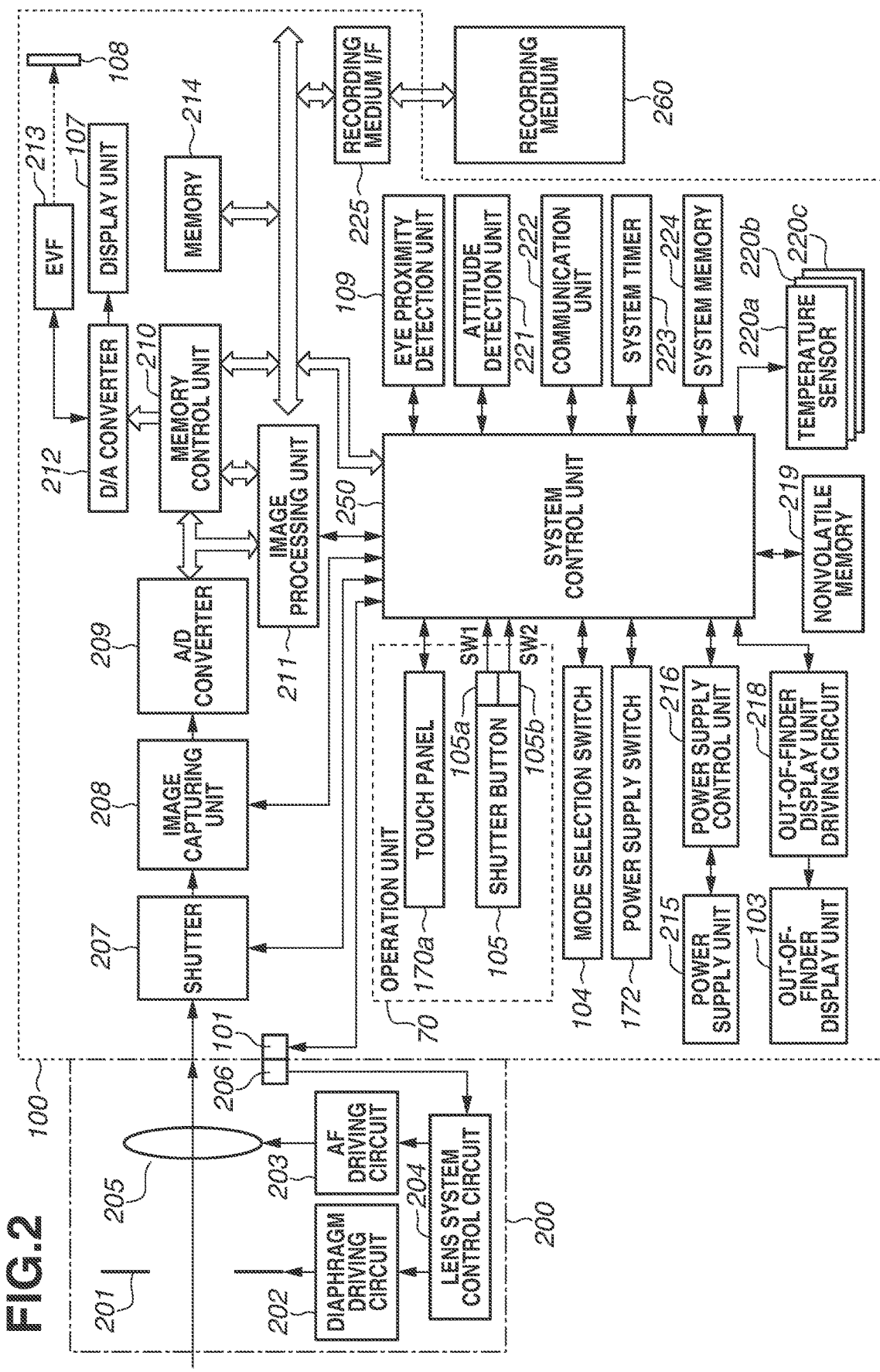
FIG. 2 is a block diagram illustrating a configuration example of the digital camera according to the first exemplary embodiment.

FIG. 2 is a block diagram illustrating a configuration example of the digital camera 100 according to the present exemplary embodiment. In the present exemplary embodiment, the digital camera 100 is interchangeably mounted with the lens unit 200 including an image capturing lens.

The lens unit 200 includes a diaphragm 201, a diaphragm driving circuit 202, an autofocus (AF) driving circuit 203, a lens system control circuit 204, a lens 205, and a communication terminal 206. The lens system control circuit 204 controls the blocks of the lens unit 200 to implement lens control. For example, the lens system control circuit 204 controls the diaphragm 201 through the diaphragm driving circuit 202, and displaces the lens 205 through the AF driving circuit 203 to adjust a focal point. The lens 205 typically includes a plurality of lenses such as a zoom lens and a focus lens. However, in one embodiment, only one lens is illustrated in FIG. 2 for simplification. The communication terminal 206 is a communication terminal for the lens unit 200 to communicate with the digital camera 100, and communicates with a system control unit 250 through the above-described communication terminal 101. The lens unit 200 may be fixed to the digital camera 100.

A shutter 207 is a focal plane shutter that can control an exposure time of an image capturing unit 208 by being driven in response to a control by the system control unit 250 described below.

The image capturing unit 208 is an image capturing device that includes a charge-coupled device (CCD) sensor or a complementary metal-oxide semiconductor (CMOS) sensor to convert an optical image of an object entering the image capturing unit 208 through the lens unit 200, into an electric signal.

An analog-to-digital (A/D) converter 209 converts an analog signal output from the image capturing unit 208 into a digital signal.

A memory control unit 210 controls data transmission/reception between the A/D converter 209, an image processing unit 211 described below, and a memory 214 described below. Output data from the A/D converter 209 is written in the memory 214 through the image processing unit 211 and the memory control unit 210 or through the memory control unit 210.

The image processing unit 211 performs image processing, for example, predetermined pixel interpolation, resizing processing such as reduction, and color conversion processing on the output data (image data) from the A/D converter 209 or the image data transmitted/received by the memory control unit 210. The image processing unit 211 further performs predetermined calculation processing by using captured image data output from the image capturing unit 208 through the A/D converter 209. The system control unit 250 described below controls the blocks relating to the image capturing, such as the lens system control circuit 204, the shutter 207, and the image capturing unit 208 based on an acquired calculation result, to perform exposure control and ranging control. In this way, the image capturing control such as through-the-lens (TTL) AF processing, AE processing, and flash pre-emission (EF) processing is performed. The image processing unit 211 further performs predetermined calculation processing by using the captured image data, and performs image processing such as TTL automatic white balance (AWB) processing based on an acquired calculation result.

A digital-to-analog (D/A) converter 212 converts a digital signal output from the memory control unit 210 into an analog display signal.

Each of the display unit 107 and the EVF 213 includes a liquid crystal display (LCD), an organic electroluminescence (EL) display, or any of other displays, and performs display corresponding to output data that has been output from the memory control unit 210 and converted by the D/A converter 212. The image data acquired through the lens unit 200 and the image capturing unit 208 is successively transferred to and displayed on the display unit 107 or the EVF 213, which implements live view display. In the following descriptions, an image displayed in the live view display is referred to as a live view image.

The memory 214 stores the image data that has been acquired by the image capturing unit 208 and converted into the digital data by the A/D converter 209, and the image data to be displayed on the display unit 107 or the EVF 213. The memory 214 includes a storage capacity sufficient to store a predetermined number of still images and a moving image and voice for a predetermined time. Further, the memory 214 also serves as an image display memory (video memory). The display image data written in the memory 214 is displayed on the display unit 107 or the EVF 213 through the memory control unit 210.

An operation unit 70 includes various kinds of operation members, as an input unit receiving operation from the user. The operation unit 70 includes the operation members relating to an image capturing instruction, such as the shutter button 105, the moving image button 176, and the AE lock button 177. The operation unit 70 may further include operation members for changing settings, such as the main electronic dial 171, the electronic sub-dial 173, the cross key 174, the set button 175, and the menu button 180. In addition, the touch panel 170a, the power supply switch 172, the enlargement button 178, the reproduction button 179, and the like are also included in the operation unit 70 in the present exemplary embodiment.

The touch panel 170a and the display unit 107 can be integrally configured. For example, the touch panel 170a has a light transmittance not interfering with display of the display unit 107, and is attached to an upper layer of a display surface of the display unit 107. Further, input coordinates in the touch panel 170a and display coordinates on a display screen of the display unit 107 are associated with each other. This can provide a graphical user interface (GUI) as if the user directly operates the screen displayed on the display unit 107.

In addition to the operation unit 70, the mode selection switch 104, a first shutter switch 105a, and a second shutter switch 105b are also operation input units that can input various kinds of operation instructions to the system control unit 250 described below. The mode selection switch 104 switches the operation mode of the system control unit 250 to any of a plurality of modes including a still image capturing mode and a moving image capturing mode. Examples of modes included in the still image capturing mode include an automatic image capturing mode, an automatic scene determination mode, a manual mode, an aperture value priority mode (Av mode), a shutter speed priority mode (Tv mode), and a program AE mode (P mode). Examples of the modes included in the still image capturing mode further include various kinds of scene modes having different image capturing settings for respective image capturing scenes, and a custom mode. The user can directly switch the operation mode to any of these modes by using the mode selection switch 104. Alternatively, the user once changes the screen to a list screen of the image capturing modes by using the mode selection switch 104, selects any of the plurality of displayed modes, and then changes the operation mode to the selected mode by using the other operation member. Similarly, the moving image capturing mode may include a plurality of modes.

The first shutter switch 105*a* is turned on in the middle of operation or in response to half-press of the shutter button 105 provided in the digital camera 100, and generates a first shutter switch signal SW1 (image capturing preparation instruction). In response to the first shutter switch signal SW1, the image capturing preparation operations such as the AF processing, the AE processing, the AWB processing, and the EF processing is started.

The second shutter switch 105*b* is turned on in response to the operation completion or full-depression of the shutter button 105, and generates a second shutter switch signal SW2 (image capturing instruction). In response to the second shutter switch signal SW2, the system control unit 250 starts a series of image capturing processing operations from readout of a signal from the image capturing unit 208 to writing of a captured image as an image file in the recording medium 260.

A power supply unit 215 includes a primary battery such as an alkaline battery and a lithium battery, a secondary battery such as a nickel-cadmium (NiCd) battery, a nickel-metal hydride (NiMH) battery, and a lithium-ion battery, or an alternating current (AC) adapter.

A power supply control unit 216 includes a battery detection circuit, a direct current (DC)-DC converter, and a switch circuit for switching a block to be energized, and detects presence/absence of a mounted battery, a type of the mounted battery, and a remaining capacity of the mounted battery. The power supply control unit 216 controls the DC-DC converter based on detection results and the instruction from the system control unit 250, to supply a necessary voltage to each of the units including the recording medium 260 for a necessary period of time.

The out-of-finder display unit 103 displays various setting values of the digital camera 100 including the shutter speed and the aperture value, through an out-of-finder display unit driving circuit 218.

A nonvolatile memory 219 is an electrically erasable/writable memory, and for example, a flash read only memory (ROM) is used. The nonvolatile memory 219 stores constants, programs, etc. for operation of the system control unit 250. The programs indicate programs to execute various kinds of flowcharts described below in the present exemplary embodiment.

The system control unit 250 includes at least one processor or circuit, and controls the whole of the digital camera 100. The system control unit 250 executes the programs recorded in the above-described nonvolatile memory 219 to implement processing of the present exemplary embodiment described below.

In the present exemplary embodiment, a plurality of temperature sensors is provided to acquire temperatures at predetermined positions. For example, an exterior temperature sensor 220*a*, an image capturing unit temperature sensor 220*b*, and a system control unit temperature sensor 220*c* are digital temperature sensors each including an A/D converter (not illustrated). Temperature measurement values of the respective temperature sensors are converted into Celsius temperature values inside the respective sensors, and the Celsius temperature values are taken into the system control unit 250 through serial communication at a predetermined period.

Figure 3:
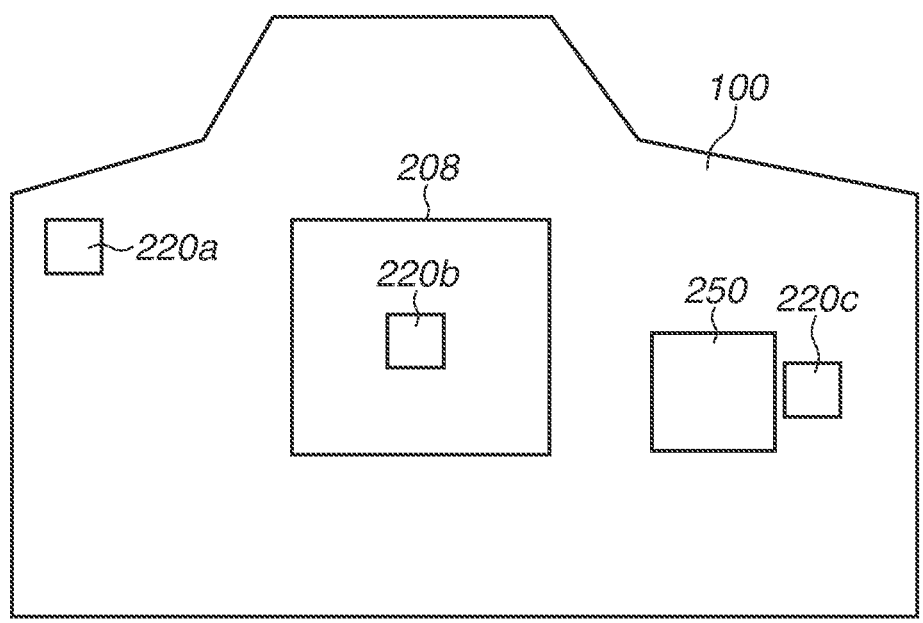
FIG. 3 is a diagram illustrating an arrangement example of temperature sensors inside a housing of the digital camera according to the first exemplary embodiment.

Arrangement of the temperature sensors according to the present exemplary embodiment is described with reference to FIG. 3. FIG. 3 illustrates an overview of an arrangement example of the exterior temperature sensor 220*a*, the image capturing unit temperature sensor 220*b*, and the system control unit temperature sensor 220*c* inside a housing when the digital camera 100 is viewed from a rear surface side.

The exterior temperature sensor 220*a* is provided to monitor a housing exterior temperature of the digital camera 100, and is disposed at a position inside the housing close to the exterior and separate from the image capturing unit 208 and the system control unit 250.

The image capturing unit temperature sensor 220*b* is provided to monitor a temperature of the image capturing unit 208, and is disposed at a periphery of the image capturing unit 208, for example, on a substrate mounted with an image capturing sensor of the image capturing unit 208.

The system control unit temperature sensor 220*c* is provided to monitor a temperature of the system control unit 250, and is disposed at a periphery of the system control unit 250, for example, on a substrate mounted with the system control unit 250.

The eye proximity detection unit 109 is an eye proximity detection sensor for detecting approach (eye proximity) and separation (eye separation) of an eye to the eyepiece portion 108 of the finder (proximity detection). The system control unit 250 switches display (display state)/non-display (non-display state) of the display unit 107 and the EVF 213 based on a state detected by the eye proximity detection unit 109. More specifically, in a case where the digital camera 100 is at least in the image capturing standby state and the switching setting of a display destination is set to automatic switching, when the eye is separated from the eyepiece portion 108, the display unit 107 is turned on and an image is displayed on the display unit 107, but the image is not displayed on the EVF 213. On the other hand, when the eye is in proximity to the eyepiece portion 108, the EVF 213 is turned on and the image is displayed on the EVF 213, but the image is not displayed on the display unit 107.

The eye proximity detection unit 109 detects approach of any object to the eyepiece portion 108 of the finder incorporating the EVF 213 by using, for example, an infrared proximity sensor. When the object approaches the eyepiece portion 108, infrared rays projected from a light projection unit (not illustrated) of the eye proximity detection unit 109 are reflected and are received by a light reception unit (not illustrated) of the infrared proximity sensor. A distance (eye proximity distance) between the object and the eyepiece portion 108 can be determined based on an amount of the received infrared rays. The eye proximity detection unit 109 detects the proximity distance of the object to the eyepiece portion 108 in the above-described manner.

When the object approaching the eyepiece portion 108 within a predetermined distance from the eyepiece portion 108 from a non-eye-proximity state (unapproached state) is detected, eye proximity is detected. In a case where the object, approach of which has been detected, is separated by a predetermined distance or more from the eye proximity state (approached state), eye separation is detected. A threshold for detecting eye proximity and a threshold for detecting eye separation may be different from each other by providing, for example, hysteresis. Further, after the eye proximity is detected, the eye proximity state is continued until the eye separation is detected. After the eye separation is detected, the non-eye-proximity state is continued until the eye proximity is detected. Note that the infrared proximity sensor is just an example, and other sensors that can detect approach of an eye or an object regarded as eye proximity may be employed as the eye proximity detection unit 109.

An attitude detection unit 221 detects an attitude of the digital camera 100 with respect to a gravity direction. It is possible to determine whether the image captured by the image capturing unit 208 is an image captured in a state where the digital camera 100 is held horizontally or held vertically, based on the attitude detected by the attitude detection unit 221. The system control unit 250 can add direction information corresponding to the attitude detected by the attitude detection unit 221 to an image file of the image captured by the image capturing unit 208, or can rotate and record the image. As the attitude detection unit 221, an acceleration sensor, a gyro sensor, or another sensor is usable. Motion (e.g., panning, tilting, lifting, and whether stationary) of the digital camera 100 can be detected by the attitude detection unit 221 such as the acceleration sensor and the gyro sensor.

A communication unit 222 establishes connection by radio or a wired cable, and transmits/receives an image signal and a sound signal. The communication unit can be connected to a wireless local area network (LAN) and the Internet, and can communicate with an external apparatus through Bluetooth® or Bluetooth® Low Energy. The communication unit 222 can transmit the image (including live view image) captured by the image capturing unit 208 and the image recorded in the recording medium 260, and can receive an image data and other various kinds of information from the external apparatus.

A system timer 223 is a time measurement unit measuring a time used for various kinds of control and a time of an incorporated clock.

As a system memory 224, for example, a random access memory (RAM) is used, and constants and variables for operating the system control unit 250, programs read out from the nonvolatile memory 219, and the like are loaded in the system memory 224.

A recording medium interface (I/F) 225 is an interface with the recording medium 260 such as a memory card and a hard disk.

The recording medium 260 is a recording medium such as a memory card recording the captured image, and includes a semiconductor memory, a magnetic disk. In the present exemplary embodiment, the recording medium 260 is attachable to and detachable from the digital camera 100.

The digital camera 100 according to the present exemplary embodiment is controlled to limit its operation so that the temperatures relating to the digital camera 100, for example, the exterior temperature, the image capturing unit temperature, and the system control unit temperature satisfy predetermined temperature conditions. For example, in the digital camera 100, the electronic devices such as the image capturing unit 208, the communication unit 222, the image processing unit 211, and the system control unit 250 serve as heat generation sources during the operation, and the temperature inside the housing is increased. For example, increase in temperature of the image capturing unit 208 deteriorates the captured image. Thus, each of the electronic devices has an operation guarantee upper limit temperature, and the operation is limited so that the temperature of each of the electronic devices does not exceed the upper limit temperature.

Further, since the various electronic devices are mounted in the small housing, the exterior of the housing generates heat during the operation. The exterior of the housing is directly touched by the user. Therefore, an allowable temperature preventing a state where the user cannot touch the exterior of the housing because of high temperature is provided, and the operation is limited so that the temperature of the exterior of the housing is lower than or equal to the allowable temperature.

As the operation limitation in the present exemplary embodiment, the power supply of the digital camera 100 is turned off. In place of turning off the power supply, operation limitation to stop or reduce the operation of the unit relating to the allowable temperature, for example, stopping the moving image recording, stopping the image capturing, reducing the frame rate, or turning off the display may be performed.

The temporal variation of output values of the respective temperature sensors in a case where the digital camera 100 is set to the moving image capturing mode is described with reference to FIGS. 4A to 4C. In FIG. 4A, a lateral axis represents a time, and a vertical axis represents a temperature. In FIGS. 4B to 4D, a lateral axis represents a time point, and a vertical axis represents a temperature.

FIG. 4A illustrates examples of an output value of the image capturing unit temperature sensor 220b and an output value of the exterior temperature sensor 220a when a moving image recording or a recording standby operation is started at the same timing and at the same temperature. A curve 401 represents a temporal variation of the output value of the image capturing unit temperature sensor 220b in the moving image recording, and a curve 402 represents a temporal variation of the output value of the exterior temperature sensor 220a in the moving image recording. A curve 403 represents a temporal variation of the output value of the image capturing unit temperature sensor 220b during the moving image recording standby, and a curve 404 represents a temporal variation of the output value of the exterior temperature sensor 220a during the moving image recording standby state. The curves 401 to 404 represent the values obtained by subtracting an environmental temperature $K_E$ from the output values of the respective temperature sensors, and an initial temperature of each of the curves 401 to 404 is 0° C. Relational expressions at this time are expressed in Expression 1, $y=f_{401}(t)$: relational expression representing curve 401, $y=f_{402}(t)$: relational expression representing curve 402, $y=f_{403}(t)$: relational expression representing curve 403, $y=f_{404}(t)$: relational expression representing curve 404. [Expression 1]

FIG. 4B illustrates temporal variations of the output values of the respective temperature sensors for when the digital camera 100 is in the moving image recording standby state until a time point $t_S$ and starts moving image recording at the time point $t_S$. The output value of the image capturing unit temperature sensor 220b is varied along the curve 403 that represents the temperature variation in the standby state until the time point $t_S$, and is varied along the curve 401 that represents the temperature variation during the moving image recording from the time point $t_S$. The temperature is varied along the curve 403 in the moving image recording standby state, and is varied along the curve 401 after the temperature becomes a temperature $y_{DC}$ at the time point $t_S$. Thus, in FIG. 4B, the curve 401 in FIG. 4A is shifted to become the temperature $y_{DC}$ at the time point $t_S$. Similarly, the output value of the exterior temperature sensor 220a is varied along the curve 404 until the time point $t_S$, and is varied along the curve 402 from the time point $t_S$. In FIG. 4B, the temperature of the curve 401 and the temperature of the curve 402 are 0° C. at a time point $t_O$.

When a time from the time point $t_o$ to the time point $t_S$ is defined as a time $t_C$, relational expressions of the curves illustrated in FIG. 4B are expressed in Expression 2, $$y_{DC}=f_{403}(t_S)=f_{401}(t_S-t_O)=f_{401}(t_C),$$

$$y_{OC}=f_{404}(t_S)=f_{402}(t_S-t_O)=f_{402}(t_C). \quad \text{[Expression 2]}$$

Expression 2 represents that the output value $y_{DC}$ of the image capturing unit temperature sensor 220b at the time point $t_S$ during the moving image recording standby state is coincident with the output value of the image capturing unit temperature sensor 220b after the time $t_C$ during the moving image recording. Similarly, Expression 2 represents that the output value $y_{OC}$ of the exterior temperature sensor 220a is coincident with the output value of the exterior temperature sensor 220a after the time $t_C$ during the moving image recording.

Accordingly, the time $t_C$ can be predicted from inverse functions of Expression 1 during the moving image recording standby state, as expressed in Expression 3, $$t_C=f_{401}^{-1}(y_{DC}),$$

$$t_C=f_{402}^{-1}(y_{OC}). \quad \text{[Expression 3]}$$

FIG. 4C illustrates the curves 401 and 402 shifted from those illustrated in FIG. 4B in a time point axis direction so that origins of the curves 401 and 402 are positioned at time point $t_O$, and an expression of time point $t_S$=time point $t_O$+time $t_C$ is established. From Expression 4, a moving image recording stop time point $t_{DL}$ can be predicted based on the temperature of the image capturing unit temperature sensor 220b. At this time, for example, $K_{DL}$ is an operation guarantee temperature of the image capturing unit 208 to output an undeteriorated (allowable) image, and a time point when the temperature does not exceed the operation guarantee temperature becomes the moving image recording stop time point $t_{DL}$.

Similarly, a moving image recording stop time point $t_{OL}$ can be predicted based on the temperature of the exterior temperature sensor 220a. At this time, for example, $K_{OL}$ is an allowable temperature of the exterior when the user touches the exterior, and a time point when the temperature does not exceed the allowable temperature becomes the moving image recording stop time point $t_{OL}$. In other words, in Expression 4, $K_{DL}$ is the moving image recording stop temperature based on the temperature of the image capturing unit temperature sensor 220b, and $K_{OL}$ is the moving image recording stop temperature based on the temperature of the exterior temperature sensor 220a, $$t_{DL}=f_{401}^{-1}(K_{DL}),$$

$$t_{OL}=f_{402}^{-1}(K_{OL}). \quad \text{[Expression 4]}$$

By using the time $t_C$ calculated based on Expression 3, a moving image recordable time $t_{DR}$ based on the image capturing unit temperature sensor 220b when it is assumed that the moving image recording is started at the time point $t_S$ during the moving image recording standby state can be predicted from Expression 5. Similarly, a moving image recordable time $t_{OR}$ based on the exterior temperature sensor 220a can be predicted. In Expression 5, $t_{DR}$ is the moving image recordable time based on the temperature of the image capturing unit temperature sensor 220b, and $t_{OR}$ is the moving image recordable time based on the temperature of the exterior temperature sensor 220a, $$t_{DR}=t_{DL}-t_C,$$

$$t_{OR}=t_{OL}-t_C. \quad \text{[Expression 5]}$$

Expression 1 represents the value obtained by subtracting the environmental temperature $K_E$ around the housing of the digital camera 100 from the output value of each of the temperature sensors. In the present exemplary embodiment, Expressions 1 to 5 described above are established when the environmental temperature $K_E$ is 0° C. However, the actual output value of each of the temperature sensors depends on the environmental temperature $K_E$ and is varied based on the value of the environmental temperature $K_E$.

Therefore, a relational expression in Expression 6 is defined, $$y=h_{405}(t)=f_{401}(t)-f_{402}(t). \quad \text{[Expression 6]}$$

Expression 6 is a function representing a difference between the curve 401 and the curve 402. A curve 405 in FIG. 4C is a curve represented by the relational expression in Expression 6. Unlike Expression 1, the relational expression in Expression 6 does not depend on the environmental temperature $K_E$. A temperature difference $\Delta K$ between the curve 401 and the curve 402 after the lapse of the time $t_C$ (at time point $t_S$) is uniquely determined. Accordingly, when a output difference temperature between the image capturing unit temperature sensor 220b and the exterior temperature sensor 220a is acquirable, the time $t_C$ can be determined by using Expression 6.

This is described with reference to FIG. 4D. FIG. 4D illustrates the curve 401 and the curve 402 shifted by the environmental temperature $K_E$ in the temperature axis direction from FIG. 4C. At this time, relational expressions in Expression 7 are established, $$t_C=h_{405}^{-1}(\Delta K),$$

$$\Delta K=K_{DC}-K_{OC},$$

$K_{DC}=y_{DC}+K_E$: output value of image capturing unit temperature sensor 220b, $K_{OC}=y_{OC}+K_E$: output value of exterior temperature sensor 220a. [Expression 7]

Further, the environmental temperature $K_E$ can be obtained based on any of the relational expressions in Expression 1, for example, from Expression 8. Expression 8 is an example using the relational expression representing the curve 402 in Expression 1, $$K_E=K_{OC}-y_{OC}=K_{OC}-f_{402}(t_C). \quad \text{[Expression 8]}$$

As a result, Expression 4 is rewritten to Expression 9, $$t_{DL}=f_{401}^{-1}(K_{DL}-K_E),$$

$$t_{OL}=f_{402}^{-1}(K_{OL}-K_E). \quad \text{[Expression 9]}$$

The moving image recordable time based on the temperature of each of the temperature sensors can be predicted by substituting Expression 9 into Expression 5.

The image capturing unit temperature sensor 220b and the exterior temperature sensor 220a have been described above as the examples. When the image capturing unit temperature sensor 220b is replaced with the system control unit temperature sensor 220c, the moving image recordable time until the temperature of the system control unit 250 reaches the operation guarantee upper limit temperature can be predicted.

In any case, the output difference value between the temperature sensor disposed near the electronic device serving as the heat generation source and the temperature sensor disposed near the exterior of the housing hardly influenced by the heat generation of the electronic device is used. When the output difference value between the temperature sensors is increased, the prediction accuracy of the time $t_C$ in Expression 7 is improved. As a result, the prediction accuracy of the environmental temperature $K_E$ in Expression 8 and the prediction accuracy of the moving image recordable time based on the temperature of each of the temperature sensors in Expression 5 are improved.

A method of predicting and displaying an operable time (moving image recordable time) of the digital camera 100 according to the present exemplary embodiment is described with reference to FIG. 5.

Figure 5:
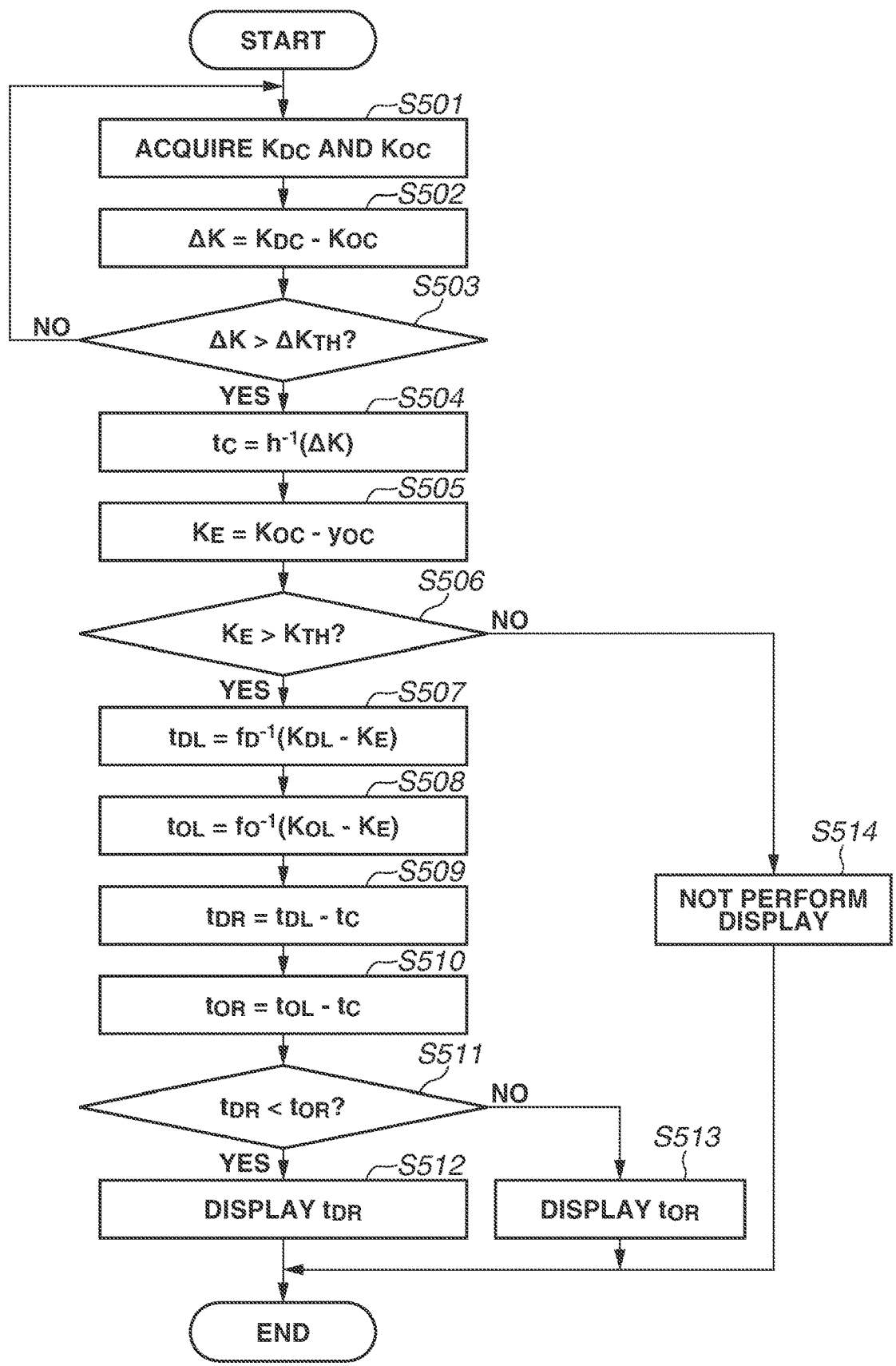
FIG. 5 is a flowchart illustrating prediction control of a moving image recordable time of the digital camera according to the first exemplary embodiment.

FIG. 5 is a flowchart illustrating a procedure of controlling processing to predict the operable time of the digital camera 100 according to the present exemplary embodiment. Processing in the flowchart of FIG. 5 is implemented by the system control unit 250 loading the programs stored in the nonvolatile memory 219 to the system memory 224, and executing the programs to control the functional blocks. The flowchart of FIG. 5 is started when the digital camera 100 is activated and is put into the moving image recording standby state by setting the digital camera 100 into the moving image capturing mode.

In step S501, the system control unit 250 acquires the output value $K_{DC}$ of the image capturing unit temperature sensor 220b and the output value $K_{OC}$ of the exterior temperature sensor 220a at the current time point is during the moving image recording standby state.

In step S502, the difference value $\Delta K$ between the output value $K_{DC}$ of the image capturing unit temperature sensor 220b and the output value $K_{OC}$ of the exterior temperature sensor 220a is calculated.

In step S503, it is determined whether the difference value $\Delta K$ is greater than a predetermined threshold $\Delta K_{TH}$. In a case where the difference value $\Delta K$ is greater than the threshold $\Delta K_{TH}$ (YES in step S503), the processing proceeds to step S504. In a case where the difference value $\Delta K$ is less than or equal to the threshold $\Delta K_{TH}$ (NO in step S503), the processing returns to step S501. In a case where the difference value $\Delta K$ between the output value $K_{DC}$ of the image capturing unit temperature sensor 220b and the output value $K_{OC}$ of the exterior temperature sensor 220a is excessively small, the prediction accuracy of the time $t_C$ is lowered. Accordingly, steps S501 and S502 are repeated until the difference value $\Delta K$ becomes greater than the threshold $\Delta K_{TH}$. The threshold $\Delta K_{TH}$ is a value at which the prediction accuracy of the time $t_C$ is allowable, preset based on, for example, experimental values. The threshold $\Delta K_{TH}$ is previously stored in the nonvolatile memory 219, and is read out by the system control unit 250.

In step S504, the moving image recording time $t_C$ corresponding to the difference value $\Delta K$ calculated in step S502 is calculated. The relational expressions (temperature curve information) in Expression 7 different depending on the plurality of moving image capturing modes are previously stored in the nonvolatile memory 219, and the system control unit 250 reads out the relational expressions in Expression 7 corresponding to the moving image capturing mode in use, and calculates the moving image recording time $t_C$.

In step S505, the environmental temperature $K_E$ is calculated from the moving image recording time $t_C$ calculated in step S504. The relational expressions in Expression 8 different depending on the plurality of moving image capturing modes are stored in the nonvolatile memory 219, and the system control unit 250 reads out the relational expression in Expression 8 corresponding to the moving image capturing mode in use, and calculates the environmental temperature $K_E$.

In step S506, it is determined whether the environmental temperature $K_E$ is greater than a predetermined threshold $K_{TH}$. In a case where the environmental temperature $K_E$ is greater than the threshold $K_{TH}$ (YES in step S506), the processing proceeds to step S507. In a case where the environmental temperature $K_E$ is less than or equal to the predetermined threshold $K_{TH}$ (NO in step S506), the processing proceeds to step S514. The threshold $K_{TH}$ is previously stored in the nonvolatile memory 219, and is read out by the system control unit 250. The threshold $K_{TH}$ indicates the environmental temperature at which the temperature inside the housing of the digital camera 100 does not reach an operable upper limit temperature. This determination makes it possible to skip unnecessary calculation processing in a situation where the environmental temperature $K_E$ is less than or equal to the threshold $K_{TH}$ and the temperature inside the housing of the digital camera 100 does not reach the operable upper limit temperature, and thus to reduce a load of the CPU.

In step S507 and step S508, the moving image recording stop time point $t_{DL}$ based on the temperature of the image capturing unit temperature sensor 220b and the moving image recording stop time point $t_{OL}$ based on the temperature of the exterior temperature sensor 220a are calculated based on the relational expressions in Expression 4. The relational expressions (temperature curve information) in Expression 4 different depending on the plurality of moving image capturing modes are previously stored in the nonvolatile memory 219, and the system control unit 250 reads out the relational expression in Expression 4 corresponding to the moving image capturing mode in use.

In step S509 and step S510, the moving image recordable time $t_{DR}$ based on the image capturing unit temperature sensor 220b and the moving image recordable time $t_{OR}$ based on the exterior temperature sensor 220a are calculated based on the relational expressions in Expression 5.

In step S511, it is determined whether the moving image recordable time $t_{DR}$ is less than the moving image recordable time $t_{OR}$. In a case where the moving image recordable time $t_{DR}$ is less than the moving image recordable time $t_{OR}$ (YES in step S511), the processing proceeds to step S512. In a case where the moving image recordable time $t_{DR}$ is greater than or equal to the moving image recordable time $t_{OR}$ (NO in step S511), the processing proceeds to step S513.

In step S512, the system control unit 250 displays the moving image recordable time $t_{DR}$ on the display unit 107 or the EVF 213.

In step S513, in the case where the moving image recordable time $t_{DR}$ is greater than or equal to the moving image recordable time $t_{O_R}$, the system control unit 250 displays the moving image recordable time $t_{OR}$ on the display unit 107 or the EVF 213.

In step S514, in the case where the environmental temperature $K_E$ is less than or equal to the threshold $K_{TH}$, the system control unit 250 does not display the moving image recordable time on the display unit 107 and the EVF 213.

Figure 6:
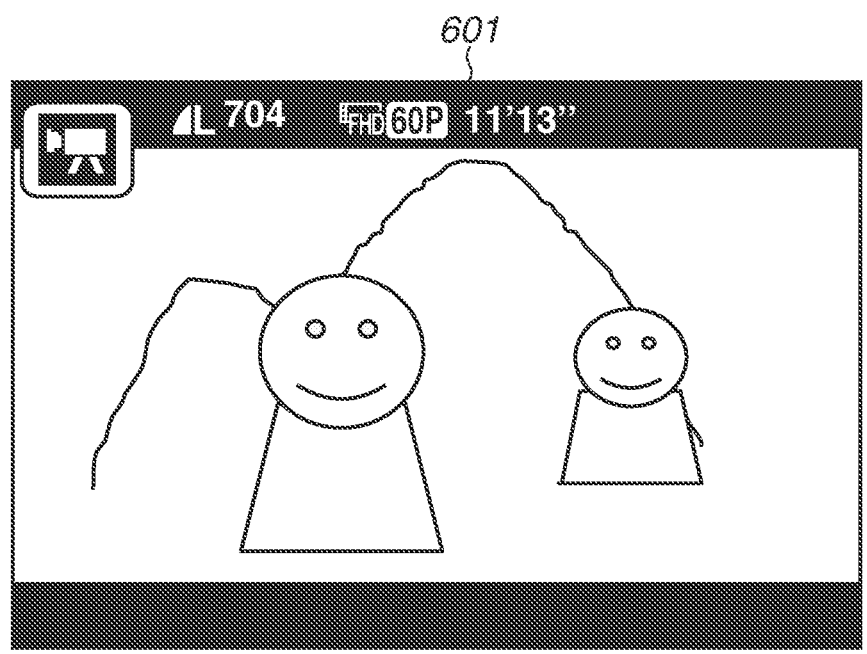
FIG. 6 illustrates an example of a display screen of the digital camera according to the first exemplary embodiment.

Next, a method of displaying the moving image recordable time on the display unit 107 or the EVF 213, performed in step S512 and step S513 is described with reference to FIG. 6. FIG. 6 illustrates an example of a display screen of the digital camera 100 according to the present exemplary embodiment, and illustrates a display example of the moving image recordable time on the display unit 107 or the EVF 213 in the moving image recording standby state. The image data captured by the image capturing unit 208 is successively transferred and is displayed as the live view image on the display unit 107 or the EVF 213. Various kinds of image capturing parameters are displayed in a superimposed manner on the live view image.

A time 601 represents the moving image recordable time until the temperature of the digital camera 100 reaches the operable upper limit temperature in a case where the moving image recording is started at the current time point. When the moving image recording standby state is continued, the temperature inside the housing of the digital camera 100 is increased. Accordingly, the moving image recordable time displayed as the time 601 is gradually decreased. In a case where the moving image recordable time is shorter than a recording time expected by the user, the user can perform action such as stopping the image capturing operation of the digital camera 100. Stopping the image capturing operation can prevent heat generation by the image capturing unit 208 and the system control unit 250. Thus, the moving image recordable time can be recovered.

The present exemplary embodiment has been described above. The control of the system control unit 250 may be performed by one piece of hardware, or a plurality of pieces of hardware may share the processing to control the whole of the apparatus.

According to the present exemplary embodiment, during the moving image recording standby state, the moving image recordable time when it is assumed that the moving image recording is started can be predicted, and the moving image recordable time can be displayed on the display unit 107 or the EVF 213 of the digital camera 100. The user can check whether the moving image recordable time satisfies a desired moving image recording time before starting the moving image recording, and then can start the moving image recording. This improves convenience.

Further, by using the difference value $\Delta K$ between outputs of the two different temperature sensors, i.e., between the output value $K_{DC}$ of the image capturing unit temperature sensor 220b and the output value $K_{OC}$ of the exterior temperature sensor 220a, the time $t_C$ can be calculated without being influenced by the variation of the environmental temperature $K_E$.

It is considered that, in the case where the difference value $\Delta K$ calculated in step S502 described above is small, the prediction accuracy of the time $t_C$ in step S504 is lowered, and the prediction accuracy of the moving image recordable time is lowered as a result. In the present exemplary embodiment, the moving image recordable time can be displayed only when the reliability of the prediction accuracy is high, by determining whether the difference value $\Delta K$ is greater than the predetermined threshold $\Delta K_{TH}$. This makes it possible to reduce possibility that incorrect information is notified to the user.

In the present exemplary embodiment, according to the configuration of calculating the environmental temperature $K_E$ in step S505, it is possible to improve the prediction accuracy of the operable time under the environment where the environmental temperature is varied.

Further, using the temperature sensors for monitoring the temperatures inside the housing of the digital camera 100 makes it possible to predict the environmental temperature without an additional part to acquire the environmental temperature.

In the first exemplary embodiment, the two different temperature sensors have been used. For example, in a case where the digital camera 100 is used in an environment where the environmental temperature $K_E$ is considered to be constant, one of the temperature sensors inside the housing of the digital camera 100 may be used to calculate the moving image recordable time. This can reduce the number of components compared with that of the first exemplary embodiment, and is beneficial in cost.

Further, when the image capturing unit temperature sensor 220b is replaced with the system control unit temperature sensor 220c in the first exemplary embodiment, it is possible to predict the operable time until the temperature of the system control unit 250 reaches the operable upper limit temperature. The type of the electronic device required to stop operation is different depending on the type of the moving image capturing mode of the digital camera 100. For example, in the moving image capturing mode of a high frame rate in which a full high definition (HD) moving image is captured at a frame rate of 240 fps, the power consumption of the image capturing unit 208 is high and generates more heat as compared with the moving image capturing mode of a low frame rate in which a full HD moving image is captured at a frame rate of 30 fps. Therefore, in one embodiment, the moving image recordable time is predicted using the image capturing unit temperature sensor 220b.

On the other hand, in the moving image capturing mode of the low frame rate and high resolution in which an 8K moving image is captured at the frame rate of 30 fps, a load of developing processing is high and the power consumption of the system control unit 250 becomes high as compared with the moving image capturing mode of the low resolution in which the full HD moving image is captured at the frame rate of 30 fps. Accordingly, in one embodiment, the moving image recordable time is predicted by using the system control unit temperature sensor 220c.

As described above, the temperature sensor used for calculating the moving image recordable time can be switched depending on the type of the moving image capturing mode.

In the first exemplary embodiment, out of the moving image recordable time $t_{DR}$ based on the temperature of the image capturing unit temperature sensor 220b and the moving image recordable time $t_{OR}$ based on the temperature of the exterior temperature sensor 220a, the shorter moving image recordable time is displayed. In a case where the digital camera 100 includes three or more temperature sensors, the lengths of the moving image recordable times based on all of the temperature sensors may be compared, and the shorter moving image recordable time can be displayed.

In the first exemplary embodiment, in the case where the moving image recordable time is not limited, the moving image recordable time is not displayed in step S514. Alternatively, for example, an icon representing that the moving image is recordable without limitation may be displayed. In addition, the moving image recordable time limited by other factors such as a card capacity and a battery capacity and the moving image recordable time limited by increase in temperature inside the housing of the digital camera 100 can be compared, and the shorter moving image recordable time can be displayed.

In the first exemplary embodiment, the moving image recordable time is displayed as the time in FIG. 6. Alternatively, for example, the moving image recordable time may be notified by displaying a meter suitable for showing the time or other icons. Any display method is usable as long as the moving image recordable time can be notified. As the time 601, the moving image recordable time taking the recordable capacity of the recording medium 260 into consideration can be displayed. In a case where the moving image recordable time based on the recordable capacity of the recording medium 260 is shorter than the moving image recordable time limited by the temperature, the moving image recordable time based on the recordable capacity may be displayed.

Further, as long as the operable time limited by the temperature condition can be predicted and notified, in one embodiment, the operable time relating not only to the moving image recording but also to other functions may be notified.

In the first exemplary embodiment, the live view image is displayed in the moving image recording standby state. However, any operation state may be defined as the moving image recording standby state as long as the features of the disclosure enabling prediction of the moving image recordable time are not lost.

Although the disclosure has been described in detail based on the digital camera as the present exemplary embodiment, the disclosure is not limited to the specific exemplary embodiment, and various modes within a range not departing from the spirit of the disclosure are also included in the disclosure. Further, the present exemplary embodiment is applicable to any of electronic apparatuses including a device that generates heat. The present exemplary embodiment of the disclosure is applicable to, for example, a personal computer, a personal digital assistant (PDA), a mobile phone terminal, a game machine, an electronic book reader, and a wearable device such as a head mounted display. In any of application examples, the moving image recordable time limited by increase in temperature inside a housing of the electronic apparatus can be predicted by the present exemplary embodiment.

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-047684, filed Mar. 18, 2020, and No. 2020-047685, filed Mar. 18, 2020, which are hereby incorporated by reference herein in their entirety.

What is claimed is:

1. An apparatus, comprising:
   a first sensor configured to acquire a first temperature at a predetermined position;
   a second sensor configured to acquire a second temperature at a position different from the predetermined position;
   a controller configured to limit a predetermined function; and
   a prediction unit configured to obtain an environmental temperature based on a difference between the first temperature and the second temperature, and information about temporal variation of the difference between the first temperature and the second temperature in a case where the predetermined function is performed,
   wherein the prediction unit is implemented via at least one processor.

2. The apparatus according to claim 1, wherein the prediction unit obtains an operable time until the controller limits the predetermined function, based on the environmental temperature.

3. The apparatus according to claim 2, wherein the prediction unit obtains the operable time by correcting a temperature when the controller limits the predetermined function based on the environmental temperature.

4. The apparatus according to claim 2, wherein the prediction unit obtains the operable time based on the first temperature, and information about temporal variation of the first temperature in the case where the predetermined function is performed.

5. The apparatus according to claim 4, further comprising a storage unit configured to store the information about the temporal variation of the first temperature in the case where the predetermined function is performed.

6. The apparatus according to claim 2, further comprising a display configured to display the operable time.

7. The apparatus according to claim 6,
   wherein the prediction unit obtains the operable time based on the second temperature, and information about temporal variation of the second temperature in the case where the predetermined function is performed, and
   wherein the display displays a shorter one of the operable time obtained based on the information about the temporal variation of the first temperature and the operable time obtained based on the information about the temporal variation of the second temperature.

8. The apparatus according to claim 1, further comprising a storage unit configured to store the information about the temporal variation of the difference between the first temperature and the second temperature in the case where the predetermined function is performed.

9. A method of controlling an apparatus, the apparatus including a first sensor configured to acquire a first temperature at a predetermined position, a second sensor configured to acquire a second temperature at a position different from the predetermined position, and a controller configured to limit a predetermined function, the method comprising obtaining an environmental temperature based on a difference between the first temperature and the second temperature, and information about temporal variation of the difference between the first temperature and the second temperature in a case where the predetermined function is performed.

10. A non-transitory computer-readable storage medium storing a program to cause a computer to perform the control method according to claim 9.

11. An image capturing apparatus for capturing an image, comprising:
  a first sensor configured to acquire a first temperature at a predetermined position;
  a second sensor configured to acquire a second temperature at a position different from the predetermined position;
  a controller configured to limit a predetermined function; and
  a prediction unit configured to obtain an environmental temperature based on a difference between the first temperature and the second temperature, and information about temporal variation of the difference between the first temperature and the second temperature in a case where the predetermined function is performed,
  wherein the prediction unit is implemented via at least one processor.

12. The image capturing apparatus according to claim 11, wherein the prediction unit obtains an operable time until the controller limits the predetermined function, based on the environmental temperature.

13. The image capturing apparatus according to claim 12,
  wherein the predetermined function is a function to capture the image, and
  wherein the operable time is an image capturable time.

14. The image capturing apparatus according to claim 13, further comprising a storage unit,
  wherein the image capturing apparatus includes a plurality of image capturing modes to capture the image, and
  wherein the storage unit stores, for each of the plurality of image capturing modes, the information about the temporal variation of the difference between the first temperature and the second temperature in the case where the predetermined function is performed.

15. The image capturing apparatus according to claim 13, further comprising a storage unit,
  wherein the image capturing apparatus includes a plurality of image capturing modes to capture the image, and
  wherein the storage unit stores, for each of the plurality of image capturing modes, information about temporal variation of the first temperature in the case where the predetermined function is performed.

* * * * *